United States Patent
Ramanan

(10) Patent No.: US 10,252,223 B2
(45) Date of Patent: Apr. 9, 2019

(54) METHODS FOR MANUFACTURING ION EXCHANGE MEMBRANES

(71) Applicant: General Electric Company, Schenectady, NY (US)

(72) Inventor: Harikrishnan Ramanan, Singapore (SG)

(73) Assignee: BL Technologies, Inc., Minnetonka, MN (US)

( * ) Notice: Subject to any disclaimer, the term of this patent is extended or adjusted under 35 U.S.C. 154(b) by 454 days.

(21) Appl. No.: 14/426,517

(22) PCT Filed: Jul. 19, 2013

(86) PCT No.: PCT/US2013/051210
§ 371 (c)(1),
(2) Date: Mar. 6, 2015

(87) PCT Pub. No.: WO2014/039171
PCT Pub. Date: Mar. 13, 2014

(65) Prior Publication Data
US 2015/0217239 A1     Aug. 6, 2015

Related U.S. Application Data

(60) Provisional application No. 61/698,210, filed on Sep. 7, 2012.

(51) Int. Cl.
*C08J 5/00*     (2006.01)
*B32B 37/00*    (2006.01)
(Continued)

(52) U.S. Cl.
CPC ....... *B01D 69/122* (2013.01); *B01D 67/0083* (2013.01); *B01D 69/125* (2013.01);
(Continued)

(58) Field of Classification Search
CPC ............ B01D 2323/46; B01D 67/0083; B01D 69/125; B01D 67/0086; B01D 69/06;
(Continued)

(56) References Cited

U.S. PATENT DOCUMENTS 3,207,708 A * 9/1965 Oster, Jr. ................ C08J 5/2256
                                                    204/296
4,310,631 A    1/1982 MacDonald
(Continued)

FOREIGN PATENT DOCUMENTS

JP     4816886 A      3/1973
JP    59179625 A     10/1984
(Continued)

OTHER PUBLICATIONS

Unofficial English Translation of Japanese Search Report issued in connection with corresponding JP Application No. 2015531076 dated Mar. 8, 2017.
(Continued)

*Primary Examiner* — Linda L Gray

(57) ABSTRACT

To make membranes, a plurality of membrane substrates are each wetted with a curable liquid mixture, arranged in a stack such that every pair of substrates are separated by at least one film, and moved simultaneously through a common curing region. Each wetted substrate sheet may be sandwiched between two films. After curing, the stack comprises two or more membranes with each pair of membranes separated by a film. An apparatus for making membranes comprises at least two substrate feeding devices, at least one film feeding device, one or more chemical wetting devices, a curing region, optionally, a stack separating region, and, optionally, a membrane binding or fusing region. Membrane production rate may be increased while the curing energy required per unit area of membrane is
(Continued)

decreased. The method can make, for example, ion exchange membranes.

11 Claims, 1 Drawing Sheet

(51) Int. Cl.
*B01D 69/12* (2006.01)
*C08J 5/22* (2006.01)
*B01D 67/00* (2006.01)
*B32B 37/06* (2006.01)
*B32B 38/10* (2006.01)
*B32B 38/00* (2006.01)

(52) U.S. Cl.
CPC .......... *B32B 37/0046* (2013.01); *B32B 37/06* (2013.01); *B32B 38/10* (2013.01); *C08J 5/2268* (2013.01); *C08J 5/2275* (2013.01); *B01D 2323/46* (2013.01); *B32B 38/0008* (2013.01); *B32B 2305/02* (2013.01); *B32B 2307/726* (2013.01); *B32B 2309/02* (2013.01); *B32B 2333/04* (2013.01); *B32B 2398/00* (2013.01)

(58) Field of Classification Search
CPC ..... B01D 69/12; B32B 2309/02; B32B 38/10; B32B 2307/726; B32B 2038/045; B32B 5/18; B32B 5/22; B32B 5/32; B32B 7/06; B32B 7/12; B32B 37/0038; B32B 37/06; B32B 37/18; B32B 2305/02; B32B 2305/026; B32B 37/20; B32B 37/16; B32B 37/02; B32B 38/1808; B32B 38/0036; B32B 38/105; Y10T 156/1093; Y10T 156/1052
See application file for complete search history.

(56) References Cited

U.S. PATENT DOCUMENTS

| | | | |
|---|---|---|---|
| 4,374,206 A | 2/1983 | MacDonald et al. | |
| 4,374,720 A | 2/1983 | MacDonald | |
| 4,505,797 A | 3/1985 | Hodgdon et al. | |
| 4,608,393 A * | 8/1986 | Hamano | C08J 5/2243 521/27 |
| 4,617,321 A | 10/1986 | MacDonald | |
| 4,683,018 A * | 7/1987 | Sutcliffe | B29C 33/68 156/196 |
| 5,037,858 A | 8/1991 | MacDonald | |
| 5,118,717 A | 6/1992 | Hodgdon et al. | |
| 5,145,584 A * | 9/1992 | Swamikannu | B01D 71/80 210/490 |
| 5,145,618 A * | 9/1992 | MacDonald | B29C 70/504 156/77 |
| 5,203,982 A | 4/1993 | MacDonald | |
| 5,264,125 A * | 11/1993 | MacDonald | B29C 70/504 210/500.35 |
| 5,288,547 A | 2/1994 | Elmes et al. | |
| 5,354,903 A | 10/1994 | MacDonald | |
| 5,356,936 A | 10/1994 | Howell et al. | |
| 6,410,672 B1 | 6/2002 | MacDonald et al. | |
| 7,087,654 B2 | 8/2006 | MacDonald et al. | |
| 7,968,663 B2 | 6/2011 | MacDonald et al. | |
| 8,138,291 B2 | 3/2012 | MacDonald et al. | |
| 9,073,050 B2 * | 7/2015 | MacDonald | C08J 5/2231 |
| 2003/0175533 A1 | 9/2003 | McGarry et al. | |
| 2008/0216942 A1 | 9/2008 | Hiraoka et al. | |
| 2011/0284456 A1 | 11/2011 | Brozell | |
| 2012/0006685 A1 * | 1/2012 | Van Engelen | B01D 61/44 204/627 |
| 2013/0090396 A1 | 4/2013 | MacDonald et al. | |
| 2013/0292252 A1 * | 11/2013 | Linder | B01D 61/44 204/630 |

FOREIGN PATENT DOCUMENTS

| | | | |
|---|---|---|---|
| JP | 6397635 | A | 4/1988 |
| JP | 03268930 | A | 11/1991 |
| JP | 05138785 | A | 6/1993 |
| JP | 0716936 | A | 1/1995 |
| JP | 2005066599 | A | 3/2005 |
| JP | 2005076012 | | 3/2005 |
| JP | 2005520020 | A | 7/2005 |
| JP | 2006172765 | A | 6/2006 |
| WO | 2010106357 | A1 | 9/2010 |

OTHER PUBLICATIONS

Unofficial English Translation of Japanese Office Action issued in connection with corresponding JP Application No. 2015531076 dated Mar. 21, 2017.

Unofficial English Translation of Chinese Office Action and Search Report issued in connection with corresponding CN Application No. 201380046638.2 dated Aug. 4, 2016.

International Search Report and Written Opinion issued in connection with corresponding PCT Application No. PCT/US2013/051210 dated Apr. 30, 2014.

* cited by examiner

US 10,252,223 B2

METHODS FOR MANUFACTURING ION EXCHANGE MEMBRANES

RELATED APPLICATIONS

This is a national stage application under 35 U.S.C. § 371(c) of prior-filed, co-pending, PCT application serial number PCT/US2013/051210, filed on Jul. 19, 2013, which claims priority to U.S. Provisional Application No. 61/698, 210, filed on Sep. 7, 2012, the contents of which are incorporated herein by reference.

FIELD OF THE INVENTION

The invention relates generally to methods for manufacturing membranes, and more particularly, to continuous processes for making ion exchange membranes.

BACKGROUND OF THE INVENTION

U.S. Pat. No. 5,264,125, Process for Manufacturing Continuous Supported Ion Selective Membranes Using Non-Polymerizable High Boiling Point Solvents, describes a continuous process for making a supported ion exchange membrane. The process comprises forming a continuous sandwich of a substrate and a pliable film on each face of the substrate. The films extend beyond the side edges of the substrate. The edges of the films are sealed together to form a pocket containing the substrate. Subsequently, the sandwich is pulled between a pair of squeeze rolls. A liquid is added to the pocket above the squeeze rolls to form a pool of the liquid above the squeeze rolls and between the films. The liquid wets the substrate and fills apertures in the substrate before the sandwich passes through the squeeze rolls. From the squeeze rolls, the sandwich passes through a set of means, for example heaters, for curing the liquid. Polymerizable components in the liquid are polymerized thereby forming a reinforced polymer sheet. The sandwich continues through a set of knives which remove the seals at the edges of the sandwich and through a pair of rollers which remove the films from the polymer sheet. The polymer sheet is then ready for use as an ion exchange membrane.

In the process described above, the rate of production is a function of the required curing time and the length of the curing region. Since it is costly to increase the length of the curing region, some efforts have been made to increase production rates by providing faster reactions, for example by using more active catalysts or higher curing temperatures to increase reaction rates.

SUMMARY OF THE INVENTION

In a method of making membranes, a plurality of membrane substrates are each wetted with a curable liquid mixture to form a membrane precursor. The membrane precursors are arranged in a stack with a plurality of films such that every pair of membrane precursors is separated by at least one film. The stack is moved through a curing region to convert the membrane precursors into membranes. Subsequently, the membranes are separated from the films. Any type of membrane that can be formed between films may be prepared. However, the method will be described herein primarily as used to make ion exchange membranes.

An apparatus for making membranes described in this specification comprises at least two substrate feeding devices, at least three film feeding devices, a supply of one or more curable liquid mixtures, a curing region and, optionally, a stack separating region. The feeding devices are configured to feed a set of materials comprising a film arranged between two substrates to the remainder of the apparatus.

The method and apparatus allow two or more membranes to be made simultaneously by curing two or more membrane precursors in a stack in a common production line. Two or more membranes may be made at the same time with the same or different curable liquid mixtures and the same or different substrates. In some cases, the method and apparatus may reduce the curing energy required per unit area of membrane produced. An existing membrane manufacturing line may be modified to allow it to produce two or more membranes simultaneously.

DETAILED DESCRIPTION OF THE INVENTION

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The modifier "about" used in connection with a quantity is inclusive of the stated value and has the meaning dictated by the context (e.g., includes the tolerance ranges associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

The terms "comprises", "comprising", "includes", "including", "has", "having", "containing", "contains" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

Figure 1:
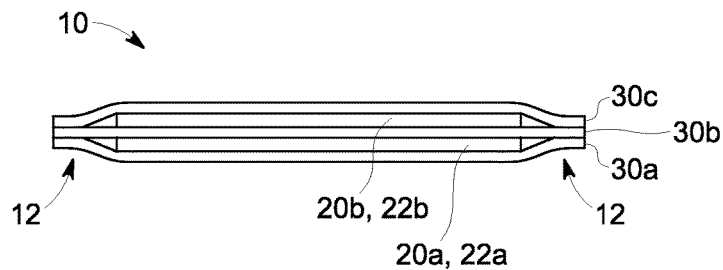
FIG. 1 is an end view of a stack in which two membranes or membrane precursors are separated by a film.

FIG. 1 shows an end view of a stack 10 in which two membranes 20a, 20b or membrane precursors 22a, 22b (depending on whether the stack 10 has been cured or not) are separated by a film, alternatively called a separator sheet or an encapsulation sheet. In the example of FIG. 1, one film 30b is shared by two membranes 20a, 20b or membrane precursors 22a, 22b. Alternatively, there may be two or more films between a pair of membranes 20a, 20b or membrane precursors 22a, 22b, for example in the position of film 30b. Additional films 30a, 30c are provided at the top and bottom of the stack 10. The pattern of the stack 10 may also be repeated to include more than two membranes 20a, 20b or membrane precursors 22a, 22b.

FIG. 1 is not to scale. In particular, the height of the stack 10 has been exaggerated to show its different layers more clearly. The height of the stack is on the order of up to a few millimeters whereas the width of the stack 10 may be on the order of tens of centimeters. The length of the stack 10 (not shown) may be tens or hundreds of meters or more and, optionally, multiple stacks 10 may be spliced together. Although the stack 10 has a finite length, over some time periods, for example an hour or more, the stack 10 or its components may pass through some or all of a manufacturing apparatus without ending. Accordingly, the stack 10 may be referred to as being of infinite length and aspects of the process may be described as being continuous even through the process will need to be interrupted from time to time, for example to provide additional amounts of the materials used to form the stack 10.

The stack 10 is shown in FIG. 1 with its various layers oriented horizontally and stacked above or below each other. However, the stack 10 may also exist in other orientations. For example, the layers may be oriented vertically and stacked side by side, or the layers may be oriented on an angled slant.

The stack 10 shown in FIG. 1 has films 30a, 30b, 30c that extend beyond the membranes 20a, 20b or membrane precursors 22a, 22b and are joined together at a sealing region 12 at the edges of the stack 10. Alternatively, the films 30a, 30b, 30c may extend beyond the membranes 20a, 20b or membrane precursors 22a, 22b but not be sealed to each other. Further, the stack 10 may have films 30a, 30b, 30c that extend to a lesser degree, or do not extend, beyond the membranes 20a, 20b or membrane precursors 22a, 22b. For example, near the end of the manufacturing process, to be described below, some or all of the extending portions of the films 30a, 30b, 30c may be cut from the stack 10.

Figure 2:
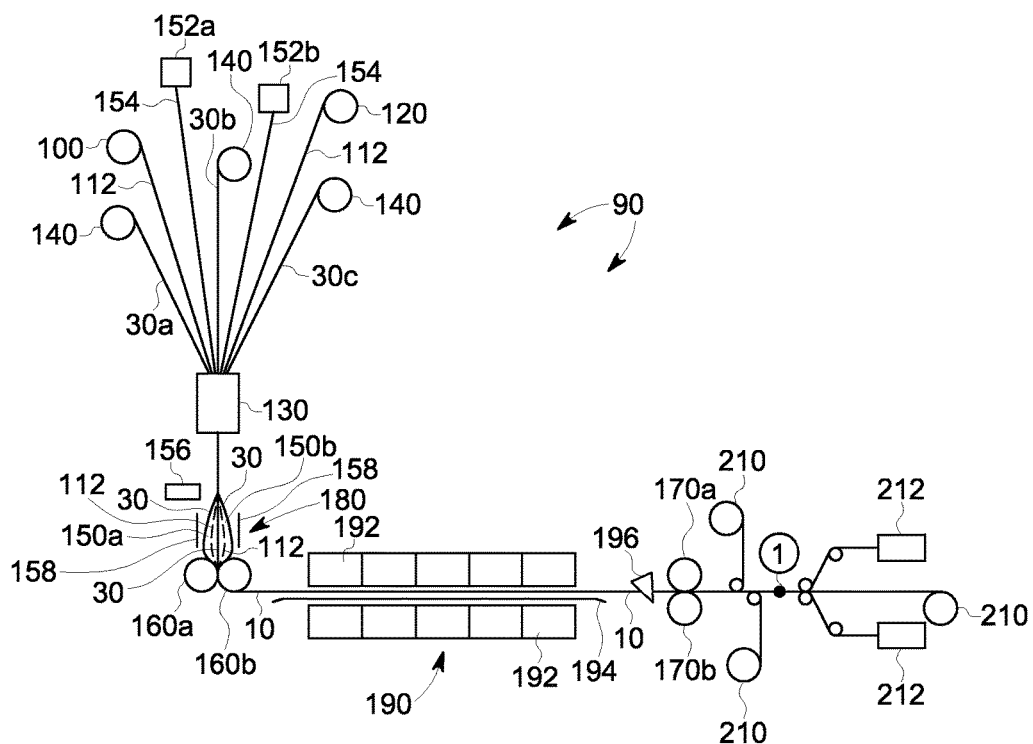
FIG. 2 is a schematic diagram of an apparatus for manufacturing membranes.

FIG. 2 is a schematic diagram of an apparatus 90 for manufacturing membranes. A first substrate feeder 100 and a second substrate feeder 120 feed sheets of substrate 112 into the remainder of the apparatus 90. For example, the substrates 112 may be provided on rolls in the substrate feeders 100, 120. The substrate feeders 100, 120 may be passive, apply a resistance to unrolling, or be powered to encourage unrolling, as required to provide a desired line speed and tension in combination with other elements of the apparatus 90. In the example of FIG. 2, each of the substrate feeders 100, 120 provides a quantity of the same substrate 112. Optionally, one of the substrate feeders 100, 120 may provide a different substrate. Optionally, more feeders and substrates may be provided. Further optionally, any of the substrate feeders 100, 120 may provide a multitude of substrates 112 which may be fused together.

The feeding area 100 also includes three film feeders 140. Each film feeder 140 feeds a sheet of film into the remainder of the apparatus 90. For example, the films 30a, 30b, 30c may be provided on rolls in the film feeders 140. The film feeders 140 may be passive, apply a resistance to unrolling, or be powered to encourage unrolling, as required to provide a desired line speed and tension in combination with other elements of the apparatus 90. In the example of FIG. 2, each of the film feeders 140 provides a quantity of the same film. Optionally, one or more film feeders 140 may provide a different film. Further optionally, more feeders and films may be provided. For example, an additional film may be provided between the two substrates 112 or around one or more additional substrates 112. Further optionally, any of the feeders 140 may provide a multitude of films as well.

The substrate feeders 100, 120 and film feeders 140 are arranged such that films 30a, 30b, 30c are fed between two sheets of substrate 112 and outside of the two sheets of substrate 112. The resulting array of substrates 112 and films 30a, 30b, 30c travels with their respective longitudinal centerlines moving essentially in a single plane. The substrates 112 and films 30a, 30b, 30c may be brought into a desired spacing or alignment relative to each other by passing over one or more devices such as rollers, belts or guides (not shown).

The substrates 112 and films 30a, 30b, 30c optionally pass through an edge sealing device 130. In the edge sealing device 130, the edges of two or more films 30a, 30b, 30c are sealed together, and in an embodiment, beyond the edges of a substrate 112 located between the films 30a, 30b, 30c. The edges of two or more films may be sealed together, for example, by passing them by an energy source, such as a heater or an ultrasonic welder, to melt the edges of the films, and pressing the molten films together. The pressing step may be performed after or during the step of melting the films. Sealing the edges of the films 30a, 30b, 30c together helps facilitate the substrate wetting process to be described below. However, if a modified or other wetting process is used, the sealing device 130 might be omitted.

In the example of FIGS. 1 and 2, the edge sealing device 130 seals all three of the films 30a, 30b, 30c together. Alternatively, an additional film could be provided in the position of the central film 30b. In that case, the edge sealing device 130 could be configured to seal two films together around one substrate 112 and two other films together around the other substrate 112.

The substrates 112 and films 30a, 30b, 30c next pass through a wetting area 180. In the wetting area 180, the substrates 112 are each wetted with a curable liquid and form membrane precursors 22a, 22b. In the example of FIG. 2, a first curable liquid 150a is provided from a first liquid feeder 152a and a second curable liquid 150b is provided from a second liquid feeder 152b. The first curable liquid 150a and the second curable liquid 150b may contain the same compounds in the same concentrations, the same compounds in different concentrations, or different compounds. In a case where the first curable liquid 150a and the second curable liquid 150b are the same, they may both be provided through a single liquid feeder.

The curable liquids 150a, 150b are fed into spaces between adjacent films through one or more tubes 154. Although not visible in FIG. 2, the tubes 154 extend below the edge sealing device 130 up to and above the nip rollers 160a, 160b. The curable liquids 150a, 150b collect in pools maintained above a pair of nip rollers 160a and 160b. The space between the nip rollers 160a, 160b is set to produce membranes of a desired thickness. Curable liquids 150a, 150b fed in excess of the amount that travels with the substrates 112 past the nip rollers 160a, 160b aaccumulates in pools above the nip rollers 160a, 160b. The height of the pools is monitored by sensor 156. A controller (not shown) uses a signal from the sensor 156 to control the liquid feeders 152 so as to maintain the depth of the pools near a preselected depth. The preselected depth, for example between 2 and 15 cm, is chosen to provide sufficient contact time between the substrates 112 and the curable liquids 150a, 150b to create the membrane precursors 22a, 22b.

Tension on the films 30a, 30b, 30c and substrates 112 tends to pull the substrates 112 against the central film 30b. To help wet the substrates, the tubes 154 are, in an embodiment, located between the central film 30b and the substrates 112. The flow of curable liquids 150a, 150b helps to preserve a space for the curable liquids 150a, 150b to be dispersed between the central film 30b and the substrates.

The weight of the curable liquids 150a, 150b causes the outer films 30a, 30c to bow outwards between the sealing regions 12. If necessary, the bowing may be contained within supporting plates 158 placed beside the outer films 30a, 30c.

Optionally, one or both substrates 112 may be wet above the pools of curable liquid 150 by passing a substrate 112, with or without another substrate 112 or a film, through another wetting device such as a slotted trough, a casting knife, nip rollers, a dip tank, or a sprayer. The wetting device may be located above or below the edge sealing device 130. Adjacent films pass around the wetting device. A wetting device may be used to pre-wet a substrate, which allows for a smaller pool of curable liquid. Alternatively, the wetting device may replace the pool. If the pool is omitted, the films may be made wider, and optionally not sealed, to provide space beside the substrate 112 for minor amounts of excess curable liquid to pass through the nip rollers.

The membrane precursors 22a, 22b and films 30a, 30b, 30c pass through the nip rollers 160a, 160b to complete the formation of a stack 10. The stack 10 then passes into a curing region 190, alternatively called a conditioning region or a polymerization region. The stack 10 is supported on a continuous or segmented platform 194 as it travels through the curing region 190. One or more curing devices 192 produce conditions in the curing region 190 that support a polymerization reaction by which the curable liquids 150a, 150b form solid polymeric membranes. A second pair of nip rollers 170a, 170b receives the stack 10 on the other end of the curing region 190. Optionally, a knife 196 located before or after the second pair of nip rollers 170a, 170b may be used to trim the edges of the films 30a, 30b, 30c from the stack 10.

In the curing region 190, the curable liquid is converted into a solid, or at least partially solid, polymer and the membrane precursors 22a, 22b are converted into membranes 20a, 20b. The liquid may be cured, for example, by heating the stack 10, or by infrared, microwave, ultraviolet or other forms of radiation. In one embodiment, the membranes may be heated to a temperature of from about 40° C. to about 200° C. as required to initiate and maintain a polymerization reaction. Other suitable temperatures for curing the membranes can be from about 50° C. to about 175° C. or from about 70° C. to about 125° C. The curing region 190 may be in the range of about 10-15 meters long. The residence time of the stack 10 in curing region 190 may be in the range of about 4 to 40 minutes. These temperatures and times may vary depending on the polymerization reaction. Alternatively, the stack 10 may be formed into discrete segments or wound into a roll and transported to a separate curing area.

The curing time for producing a plurality of membranes in a stacked configuration does not necessarily need to be increased over the time needed to produce a single membrane. Alternatively, there may be an increase in curing time but the overall production rate still increases due to multiple membranes being produced at the same time. Each additional membrane precursor brings additional material that must be cured. Typically, each additional membrane precursor and film also absorbs some heat as it passes through the curing region 190 and carries this embedded heat energy out of the curing region 190. However, because a membrane precursor is much wider than it is thick, most of the energy applied to the curing region 190 is lost through the walls or other boundaries of the curing region 190. When a stack 10 passes through the curing region, additional membrane precursors are cured to a large extent by energy, typically heat, that would be lost when curing a single membrane precursor. Accordingly, only a small increase in curing energy is required, if any. The energy consumed per unit area of membrane produced may be reduced, for example by 25% or more or 50% or more.

After the second pair of nip rollers 170a, 170b, film rollers 210 separate the stack 10 into membranes 20a, 20b and films 30a, 30b, 30c. The film rollers 210 peel the films 30a, 30b, 30c from the stack 10 and roll them up. One or more of the film rollers 210 may be driven to provide the force required to draw the stack 10 through the apparatus 90. The membranes 20a, 20b are extracted from between the films and sent to processing areas 212. In the processing areas 212, the membranes 20a, 20b may be rolled or cut into separate sheets as required. The membranes 20a, 20b may also be conditioned, for example by being cured further, stretched, annealed, shrunk, heat treated, or washed to remove any remaining solvents.

Films 30a, 30b, 30c may be prepared from any type of material that is generally impermeable to volatile components and to the membrane forming materials and allows the cured membranes to be separated from the separator sheets. For example, the films 30a, 30b, 30c may be made of thermoplastic polymer resins of the polyester family such as polyethylene terephthalate, sold for example under the trade mark Mylar™. Optionally, the separator sheets may be between 0.002 inches and 0.010 inches thick.

The substrate 112 is alternatively called a base material or a support layer and various suitable examples are commercially available. A substrate 112 typically used to make a single supported membrane may be used in the method described herein. A substrate 112 is typically made up of one or more polymers, for example acrylic, polypropylene or polyester, extruded into yarns and woven into a fabric or combined into a non-woven fabric. The curable liquids, substrates and films are selected to be compatible with each other.

Any curable liquid used to cast a single supported membrane between two films may be used. For example, the curable liquid can comprise polymerizable components and non-polymerizable solvents.

Examples of liquids that may be used as curable liquids are disclosed in U.S. Pat. No. 5,145,618 to MacDonald et al. and U.S. Pat. No. 5,264,125 to MacDonald et al., both of which are incorporated herein by reference. These are related patents and any reference to the disclosure of one of these patents is also a reference to the disclosure of the other. U.S. Pat. No. 5,264,125 disclosed a number of liquids that may be used as example curable liquids that are suitable for the purpose of making the stack 10 with the apparatus 90. All of the curable liquids disclosed by U.S. Pat. No. 5,264,125 may be suitable for this purpose. A first example curable liquid is made by mixing the following chemical components: about 60.9 kg of 2-methyl-2-[(1-oxo-2-propenyl)amino]-1-propane sulfonic acid (MOPAPS); about 12.3 g of paramethoxy phenol; about 64 liters of 1-methyl-2-pyrrolidinone; about 6.4 liters of demineralized water; about 55.4 liters of ethylene glycol dimethacrylate; about 1.86 kg of dibenzoyl peroxide; and about 0.94 kg of 1,1' azobis(cyanocyclohexane). This first example curable liquid is Example 4 in U.S. Pat. No. 5,264,125. Following the mixing of these chemical components, this first example curable liquid can be thoroughly degassed or deoxygenated and then provided to wet the substrate as described above. To polymerize this first example curable liquid, the linear velocity of the apparatus 90 may be adjusted to provide a polymerization time of about 25 minutes at a temperature of between about 70° C. to about 100° C.

Optionally, the MOPAPS in this first example curable liquid may be replaced, in whole or in part, by an equivalent amount of 2-methyl-2-[(1-oxo-2-methyl-2-propenyl)amino]-1-propane sulfonic acid.

A second example curable liquid, also based on the disclosure of U.S. Pat. No. 5,264,125, can be made by mixing the following chemical components: about 40 kg of methacrylatoethyl trimethyl ammonium chloride; about 37 kg of ethylene glycol dimethacrylate; about 52 kg of dipropylene glycol; and about 0.4 kg of 2,2' azobis(2-methyl butyronitrile). This second example curable liquid may be thoroughly degassed or deoxygenated and then provided to wet a substrate 112 as described above. To polymerize this second example curable liquid, the linear velocity of the apparatus 90 can be adjusted to give a polymerization time of about 25 minutes at a temperature between about 70° C. to about 100° C.

Other suitable examples of curable liquids include aqueous mixtures disclosed in U.S. Pat. Nos. 7,968,663 and 8,138,291 to MacDonald and Peters, both of which are incorporated herein by reference. These are related patents and any reference to the disclosure of one of these patents is also a reference to the disclosure of the other. U.S. Pat. No. 7,968,663 disclosed liquids that may be used as curable liquids made by mixing a tertiary amine, an acid, a polyexpoxide and, optionally, a water soluble, free-radical generating catalyst.

The tertiary amine may be an ethylenic tertiary amine. In one example, the ethylenic tertiary amine is selected from the group consisting of dimethylaminopropylmethacrylamide (DMAPMA), dimethylaminopropylacrylamide (DMAPAA), diethylaminopropylmethacrylamide (DEAPMA), dimethylaminoethylmethacrylate (DMAEMA) or mixtures thereof. In another example, the ethylenic tertiary amine monomer is DMAPMA.

The polyepoxide may be any type of polyepoxide having at least two epoxide groups. In one embodiment, the polyepoxide is a diglycidyl ether or a triglycidyl ether. Diglycidyl ethers include, but are not limited to, diethylene glycol diglycidyl ether, diglycidyl 1,2-cyclohexanedicarboxylate, N,N-diglycidyl-4-glycidyloxyaniline, bisphenol A diglycidyl ether, brominated bisphenol A diglycidyl ether, bisphenol F diglycidyl ether, 1,4-butanediol diglycidyl ether, 1,4-butanediyl diglycidyl ether, 1,4-cyclohexanedimethanol diglycidyl ether, glycerol diglycidyl ether, resorcinol diglycidyl ether, bis[4-(glycidyloxy)phenyl]methane, bisphenol A propoxylate diglycidyl ether, dimer acid diglycidyl ester, ethylene glycol diglycidyl ether, brominated neopentyl glycol diglycidyl ether, diglycidyl ether-terminated poly(dimethylsiloxane), poly(ethylene glycol) diglycidyl ether, poly(propyleneglycol) diglycidyl ether, 1,2,3-propanetriol glycidyl ether and 1,3-butanediol diglycidyl ether. Triglycidyl ethers include, but are not limited to, tris (2,3-epoxypropyl) isocyanurate, trimethylolpropane triglycidyl ether, tris (4-hydroxyphenyl) methane triglycidyl ether 2,6-tolylene diisocyanate, tris (4-hydroxyphenyl) methane triglycidyl ether, glycerol propoxylate triglycidyl ether or trimethylolethane triglycidyl ether.

Alternatively, the polyepoxide is a diepoxide. Diepoxides include, but are not limited to, 1,3-butadiene-diepoxide, 1,3-butadiene diepoxide, dicyclopentadiene dioxide, or methyl cis,cis-11,12,14,15-diepoxyeicosanoate.

The epoxide quaternizes the tertiary amine to form a quaternary ammonium monomer. The quaternary ammonium monomer is also crosslinked by the epoxide to make the monomer water insoluble. Without crosslinking, the resulting polymers would dissolve in water and would be ineffective for use in ion exchange materials. The polymer that results from this example curable liquid may be highly crosslinked, crosslinked in the range of from about 50 to about 100 percent or the polymer may be fully crosslinked.

The quaternizing reaction is conducted in the presence of an acid. The acid prevents the polyepoxide from self-polymerizing by quenching the reaction. The amount of quenching is controlled by the amount of acid used in the reaction. The acid may be any type of acid. For example, the acid may be a mineral acid such as hydrochloric acid, methane sulfonic acid, sulfuric acid or phosphoric acid. The acid is added in any amount suitable for quenching the polyepoxide. For example, the acid may be present in an amount of from about 75 percent by mole weight to about 125 percent by mole weight, based on the mole weight of the tertiary amine. In another example, the acid may be present in an amount of from about 75 percent by mole weight to about 100 percent by mole weight, based on the mole weight of the tertiary amine.

Examples of curable liquids made following the disclosure of U.S. Pat. No. 7,968,663 can be synthesized using a wide ratio range of the tertiary amine relative to the polyepoxide. For example, the ratio may be from about 0.3 to about 1.5 moles of the tertiary amine to each equivalent mole of the polyepoxide. In another example, the ratio is from about 0.5 to about 1.0 moles of the tertiary amine monomer per equivalent mole of the polyepoxide.

Further examples of curable liquids following the disclosure of U.S. Pat. No. 7,968,663 are made by adding further ethylenic monomers to increase or decrease the ion exchange capacity of the resulting membrane. Examples of ethylenic monomers that lower the ion exchange capacity include, but are not limited to, methacrylamine, N-methyl-methacrylamide, N-vinyl pyrrolidinone or N-vinyl caprolactam. Examples of ethylenic monomers that raise the ion exchange capacity include, but are not limited to, methacrylamidopropyl trimethylammonium chloride (MAPTAC) or trimethylammoniumethyl methacrylate chloride (TMAEMC).

The ethylenic monomers may be added to the reaction mixture with the other reactants. The ethylenic monomers may be added in any amount suitable for affecting the ion exchange capacity of the resulting membrane. For example, the ethylenic monomer is added in an amount of from about 0 to about 50 molar percent of the tertiary amine. In another example, the ethylenic monomer may be added in an amount of from about 10 to about 40 molar percent of the tertiary amine. In yet another example, the ethylenic monomer may be added in an amount of from about 20 to about 40 molar percent of the tertiary amine.

Polymerization of example curable liquida made following the disclosure of U.S. Pat. No. 7,968,663 may occur simultaneously with the quaternizing and crosslinking of the tertiary amine. The reaction of the tertiary amine and polyepoxide and the polymerization reaction may be carried out by heating the reactants and monomers to a suitable temperature and for a time sufficient for quaternizing and crosslinking the tertiary amine and for polymerizing the quaternary ammonium monomer.

A water soluble free-radical generating catalyst, which catalyzes the polymerization reaction, may be a peroxide catalyst or an azo catalyst. Examples of water-soluble peroxide catalysts include 2,4-pentanedione peroxide, hydrogen peroxide, potassium persulfate and the like. Examples of water-soluble azo catalysts include 2,2'-azobis (2-amidinopropane) dihydrochloride (also available under the trademark V-50) and 2,2'-azobis (N, N'-dimethyleneisobutyramidine) dihydrochloride. These catalyst compounds, which serve as free radical initiators, contain an —N=N— group (azo) or —O—O— group (peroxide) attached to aliphatic carbon atoms, of which at least one is tertiary. The catalyst can be added in an amount of about 0.01% to about 2% of the weight of the monomers.

The water soluble free-radical generating catalyst may be included in any amount suitable for aiding the polymerization reaction. For example, the catalyst may be used in an amount of from about 0.1 to about 5.0 percent by weight of the reaction mixture.

A third example curable liquid, based on the disclosure of U.S. Pat. No. 7,968,663, is made by a process wherein about 30.6 g of DMAPMA (0.18 mole), about 15.4 g of hydrochloric acid (0.16 mole), about 23.6 g of 1, 2, 3-propanetriol glycidyl ether (GEI00) (0.09 mole) and about 28.0 g of water are mixed and stirred for one hour. After which, about 1.4 g of the catalyst, 2,2'-azobis (N, N'-dimethylene isobutyramidine) dihydrochloride is added.

This third example curable liquid was spread onto acrylic cloth between two Mylar™ sheets and sandwiched between glass plates in U.S. Pat. No. 7,968,663. This cloth, Mylar™ and glass plate sandwich was heated for 30 minutes hours at 85° C. which resulted in a cured membrane. The resulting membrane was soaked in water and analyzed. The analysis revealed the following properties of the membrane:
  Thickness=0.063 cm
  Resistivity=11.1 ohm-cm$^2$
  Water Content=43.8%
  Capacity=2.67 milliequivalents per gram of dry resin in the nitrate form.
When the third example curable liquid is used to make a stack 10 with the apparatus 90, the apparatus 90 may be operated to provide a similar curing time and temperature.

A fourth example curable liquid, based on the disclosure of U.S. Pat. No. 7,968,663, is made by a process wherein about 30.6 g of DMAPMA (0.18 mole), about 15.4 g hydrochloric acid (0.16 mole), about 23.6 g of 1,2,3-propanetriol glycidyl ether (Gel00) (0.09 mole), about 9.4 g of N-Vinyl caprolactam (0.068 mole) and about 28.0 g of water are mixed and stirred for one hour. After which, about 1.4 g of the V-2, 2'-azobis (N, N'-dimethylene isobutyramidine) dihydrochloride catalyst is added.

This fourth example curable liquid was spread onto acrylic cloth between two Mylar™ sheets and sandwiched between glass plates in U.S. Pat. No. 7,968,663. This cloth, Mylar™ and glass plate sandwich was heated for 30 minutes hours at 85° C. which resulted in a cured membrane. The resulting membrane was soaked in water and later analyzed. The analysis revealed the following properties of the membrane:
  Thickness=0.067 cm
  Resistivity=15.4 ohm-cm$^2$
  Water Content=42.9%
  Capacity=2.35 milliequivalents per gram of dry resin in the nitrate form.
When the fourth example curable liquid is used to make a stack 10 with the apparatus 90, the apparatus 90 may be operated to provide a similar curing time and temperature.

The example curable liquids based on U.S. Pat. No. 7,968,663 may also be made with larger amounts of the chemical components to create volumes of curable liquid that are suitable for use with the apparatus 90.

Further liquids suitable for use as curable liquids for making a stack 10 using the apparatus 90 are disclosed in U.S. patent application Ser. No. 13/253,227 filed on Oct. 5, 2011, which is incorporated herein by reference. Yet further liquids suitable for use as curable liquids are disclosed in the following patents: U.S. Pat. No. 4,310,631 to MacDonald; U.S. Pat. No. 4,374,206 to MacDonald et al.; U.S. Pat. No. 4,374,720 to MacDonald; U.S. Pat. No. 4,617,321 to MacDonald; U.S. Pat. No. 5,037,858 to MacDonald; U.S. Pat. No. 5,118,717 to Hodgden et al.; U.S. Pat. No. 5,203,982 to MacDonald; U.S. Pat. No. 5,354,903 to MacDonald; U.S. Pat. No. 6,410,672 to MacDonald; and U.S. Pat. No. 7,087,654 to MacDonald, all of which are incorporated herein by reference.

Optionally, hydroquinone monomethyl ether can be added to the curable liquid to maintain a portion of the reactivity of the free radicals. This may delay the polymerization reaction so that the curable liquid can easily be introduced between the films. For example, hydroquinone monomethyl ether can be added in a ratio of about 0.095 gm for every 1.4 gm of catalyst.

In FIG. 1, the stack 10 is produced having a first separator sheet 30a, a first membrane precursor 22a over the first separator sheet 30a, a second separator sheet 30b over the first membrane precursor 22a, a second membrane precursor 22b over the second separator sheet 30b, and a third separator sheet 30c over the second membrane precursor 22b. Optionally, the pattern can be continued by adding additional pairs of a membrane precursor and separator sheet on to the stack 10. The stack 10 alternates between separator sheets and membrane precursor. Alternatively, there may be two separator sheets between successive membrane precursors. After the stack 10 passes through the curing region 190, it is converted to a stack 10 having two or more membranes in which at least one separator sheet separates each pair of membranes. The resulting, or cured, stack 10 may contain two or more membranes. For example, the stack 10 may include from 2 to 10 membranes, or from 2 to 5 membranes, or from 2 to 3 membranes.

The membranes arranged in a stack 10 may be the same kind of membrane or may be different kinds of membranes. Alternatively, the membranes may be of the same type of membrane, but may be prepared differently, have different materials or different dimensions.

Figure 3:
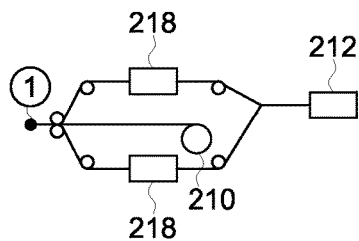
FIG. 3 is a schematic diagram of an apparatus generally as in FIG. 2 but modified to make composite or bipolar membranes.

FIG. 3 shows a modification to part of the apparatus 90 after the point 1 in FIG. 2 in which two membranes 20a, 20b are extracted from between the films 30a, 30b, 30c and then fused or bonded one on top of each to form a composite or bipolar ion exchange membrane. In the example of FIG. 3, at least one of the membranes 20a, 20b passes through a binder application area 218 in which a binder is added to the membranes 20a, 20b. The membranes 20a, 20b are subsequently brought together and bonded to each other before continuing on to the processing area 212. The binder can be applied by a device such as a slotted trough, a casting knife, nip rollers, a dip tank, or a sprayer.

The substrate 112 may be a woven or non-woven fabric, paper or a microporous diaphragm. The substrate 112 may have any thickness suitable for the type of membrane that is desired. In one embodiment, the substrate 112 is from about 10 to about 1200 micrometers thick. In another embodiment, the substrate 112 thickness is from about 140 to about 1200 micrometers.

In order that those skilled in the art will be better able to practice the present disclosure, the following examples are given by way of illustration and not by way of limitation.

EXAMPLES

Two anion exchange membranes were made simultaneously in a stack, as shown in FIG. 1, using the second example curable liquid based on U.S. Pat. No. 5,264,125 as described above. The two anion exchange membranes were cured in a curing apparatus with eight tables, each table having a first and second zone. The two anion exchange membranes were made using two different temperature profiles, high and low, within the curing apparatus, as shown in Table 1. The anion exchange membranes moved through the curing apparatus at a speed of about 4.0 to about 4.5 feet per minute (about 1.22 meters per minute to about 1.37 meters per minute).

The two membranes were separated by a polyester layer. A conventional single membrane was also made using the high temperature curing profile for comparative purposes. The water content and ion exchange capacity (IEC) properties of the resulting membranes were tested and compared between the upper and lower membranes within a stack and against the comparative single membrane. IEC was measured in milli-equivalents per gram of polymer. All of the membranes received the same soaking and washing treatments before they were tested. The results are shown in Table 3.

TABLE 1

| Temperature Profile | Zone | Table 1 | Table 2 | Table 3 | Table 4 | Table 5 | Table 6 | Table 7 | Table 8 |
|---|---|---|---|---|---|---|---|---|---|
| High | 1 | 165° F. (about 73.9° C.) | 167° F. (about 75° C.) | 171° F. (about 77.2° C.) | 176° F. (about 80° C.) | 180° F. (about 82.2° C.) | 190° F. (about 87.8° C.) | 199° F. (about 92.8° C.) | 217° F. (about 102.8° C.) |
| | 2 | 165° F. | 167° F. | 174° F. (about 78.9° C.) | 180° F. | 190° F. | 194° F. (about 90° C.) | 201° F. (about 93.9° C.) | 224° F. (about 106.7° C.) |
| Low | 1 | 165° F. | 167° F. | 171° F. | 176° F. | 180° F. | 190° F. | 199° F. | 205° F. (about 96.1° C.) |
| | 2 | 165° F. | 167° F. | 174° F. | 180° F. | 190° F. | 194° F. | 203° F. (about 95° C.) | 208° F. (about 97.8° C.) |

The two membranes were separated by a polyester layer. A conventional single membrane was also made using the high temperature curing profile for comparative purposes. The water content and ion exchange capacity (IEC) properties of the resulting membranes were tested and compared between the upper and lower membranes within the stack and against the comparative single membrane. IEC was measured in milli-equivalents per gram of polymer. All of the membranes received the same soaking and washing treatments before they were tested. The results are shown in Table 2.

TABLE 2

| Membrane | Low Water Content (%) | Low IEC | High Water Content (%) | High IEC |
|---|---|---|---|---|
| Top Membrane, Stacked | 42.89 | 2.29 | 43.21 | 2.40 |
| Bottom Membrane, Stacked | 42.09 | 2.27 | 43.07 | 2.39 |
| Comparative, Single Membranes | 42.36 | 2.29 | 42.60 | 2.38 |

The water content and IEC results for all of the membranes were similar with only a minor variation noted between the membranes prepared in the stack and the comparative membrane prepared singly, and between the top membranes and bottom membranes prepared within the stack.

Two further anion exchange membranes were made simultaneously in a stack, as shown in FIG. 1, using the fourth example curable liquid based on U.S. Pat. No. 7,968,663 as described above. These two anion exchange membranes were cured using the same temperature profiles, low and high, as set out in Table 1 above. The anion exchange membranes moved through the curing apparatus at a speed of about 3.5 feet per minute (about 1.07 meters per minute).

TABLE 3

| Membrane | Low Water Content (%) | Low IEC | High Water Content (%) | High IEC |
|---|---|---|---|---|
| Top Membrane, Stacked | 49.80 | 2.05 | 50.53 | 2.0 |
| Bottom Membrane, Stacked | 49.82 | 2.06 | 50.55 | 2.05 |
| Comparative, Single Membranes | 49.05 | 2.0 | 49.46 | 2.03 |

The water content and IEC results for all of the membranes were similar with only a 3% variation noted between the membranes prepared in the stack and the comparative membrane prepared singly, and between the top membranes and bottom membranes prepared within the stack.

While typical embodiments have been set forth for the purpose of illustration, the foregoing descriptions should not be deemed to be a limitation on the scope of the claims herein. Accordingly, various modifications, adaptations and alternatives may occur to one skilled in the art without departing from the spirit and scope of the claims herein.

What is claimed is:

1. A method of making membranes, the method comprising:
    wetting a plurality of membrane substrates, wherein each of the plurality of membrane substrates is wetted with one of a plurality of curable liquid mixtures, and wherein at least two of the plurality of curable liquid mixtures are different from each other;
    continuously arranging one or more films and the plurality of wetted substrates in a continuous stack such that a pair of the plurality of wetted substrates is separated by at least one film, and wherein the plurality of wetted substrates in the continuous stack comprises the membrane substrates that are wetted with the at least two curable liquid mixtures that are different from each other; and
    simultaneously curing the liquid mixtures in the wetted substrates in the continuous stack to produce a plurality of membranes.

2. The method of claim 1, wherein the membranes are ion exchange membranes.

3. The method of claim 1, wherein each of the wetted substrates is arranged in the stack between two films.

4. The method of claim 1, wherein the films are made of polyester.

5. The method of claim 1, wherein the stack comprises from 2 to 10 wetted substrates.

6. The method of claim 1, wherein the liquid mixtures in the wetted substrates are cured by heating or radiation.

7. The method of claim 6, wherein the liquid mixtures in the wetted substrates are heated to a temperature of from about 40° C. to about 200° C.

8. The method of claim 1, further comprising separating the membranes from the films.

9. The method of claim 8, further comprising attaching two or more membranes together after the membranes have been separated from the films.

10. The method of claim 1, wherein the at least two curable liquid mixtures that are different from each other comprise different curable compounds.

11. The method of claim 1, wherein:
one of the at least two curable liquid mixtures that are different from each other comprises a curable compound that results in an anion-exchange membrane, and
another of the at least two curable liquid mixtures that are different from each other comprises a curable compound that results in a cation-exchange membrane.

* * * * *